United States Patent
Ling et al.

(10) Patent No.: US 9,527,151 B2
(45) Date of Patent: Dec. 27, 2016

(54) WAVE SOLDERING APPARATUS AND NOZZLE THEREOF

(71) Applicant: Lenovo Enterprise Solutions (Singapore) Pte. Ltd., Singapore (SG)

(72) Inventors: Li Ling, Gui Yang (CN); Ke Pu, Shenzhen (CN); Chun C Wang, ShenZhen (CN); Wei Feng Zhang, Shenzhen (CN)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 33 days.

(21) Appl. No.: 14/315,834

(22) Filed: Jun. 26, 2014

(65) Prior Publication Data

US 2015/0014394 A1    Jan. 15, 2015

(30) Foreign Application Priority Data

Jun. 26, 2013 (CN) .......................... 2013 1 0258094

(51) Int. Cl.
*B23K 3/06* (2006.01)
*B23K 3/08* (2006.01)

(52) U.S. Cl.
CPC ............... *B23K 3/0653* (2013.01); *B23K 3/08* (2013.01)

(58) Field of Classification Search
USPC ......................................................... 228/37
See application file for complete search history.

(56) References Cited

U.S. PATENT DOCUMENTS

| | | | |
|---|---|---|---|
| 6,719,144 B2 * | 4/2004 | Tooyama | B23K 3/0646 209/10 |
| 7,905,382 B2 | 3/2011 | Zen et al. | |
| 8,403,200 B2 | 3/2013 | Heine et al. | |
| 2002/0047039 A1 * | 4/2002 | Mawatari | B23K 3/0653 228/260 |
| 2003/0080175 A1 | 5/2003 | Toba | |
| 2003/0116607 A1 * | 6/2003 | Wang | B23K 3/0653 228/37 |
| 2006/0191976 A1 * | 8/2006 | Kaneko | B23K 3/0653 228/36 |
| 2009/0321498 A1 | 12/2009 | Zen et al. | |
| 2011/0139855 A1 | 6/2011 | Ristolainen | |

(Continued)

FOREIGN PATENT DOCUMENTS

| JP | 01266961 A | * 10/1989 |
|---|---|---|
| JP | 2008244068 | 10/2008 |
| SU | 566696 A | * 8/1977 |

OTHER PUBLICATIONS

Wenesco, The Inerting Process, http://www.wenesco,com/drawpages/inerting_process.html, May 13, 2008, 2 pages.

*Primary Examiner* — Devang R Patel
(74) *Attorney, Agent, or Firm* — Douglas Robinson; Andrew M. Calderon; Roberts Mlotkowski Safran, Cole & Calderon, P.C.

(57) ABSTRACT

An apparatus used for wave soldering including a nozzle device configured to discharge molten solder to a circuit board near a solder tank, wherein, the nozzle device includes at least one pair of adjacent nozzle openings configured to discharge the molten solder towards the middle between the pair of nozzle openings.

14 Claims, 9 Drawing Sheets

(56) References Cited

U.S. PATENT DOCUMENTS

2012/0006886 A1\* 1/2012 Sato .................. B23K 1/085
 228/260
2012/0055980 A1\* 3/2012 Dong ................ B23K 3/0653
 228/219
2012/0325899 A1 12/2012 Willemen et al.

\* cited by examiner

WAVE SOLDERING APPARATUS AND NOZZLE THEREOF

FIELD OF THE INVENTION

The present invention relates to wave soldering, and particularly to a wave soldering apparatus and a nozzle thereof.

BACKGROUND

Wave soldering is a soldering technique widely used in the printed circuit board (PCB) manufacturing industry. This technique uses a solder tank to store molten solder; the molten solder is delivered to a nozzle, from which it is discharged to form a solder wave; a PCB with components inserted is passed over the solder wave by a conveying device and comes into contact with it. The molten solder is adhered on the exposed metal parts (i.e., the parts not protected by a mask) on the circuit board, thus forming reliable mechanical and electrical connections on the circuit board.

Figure 1:
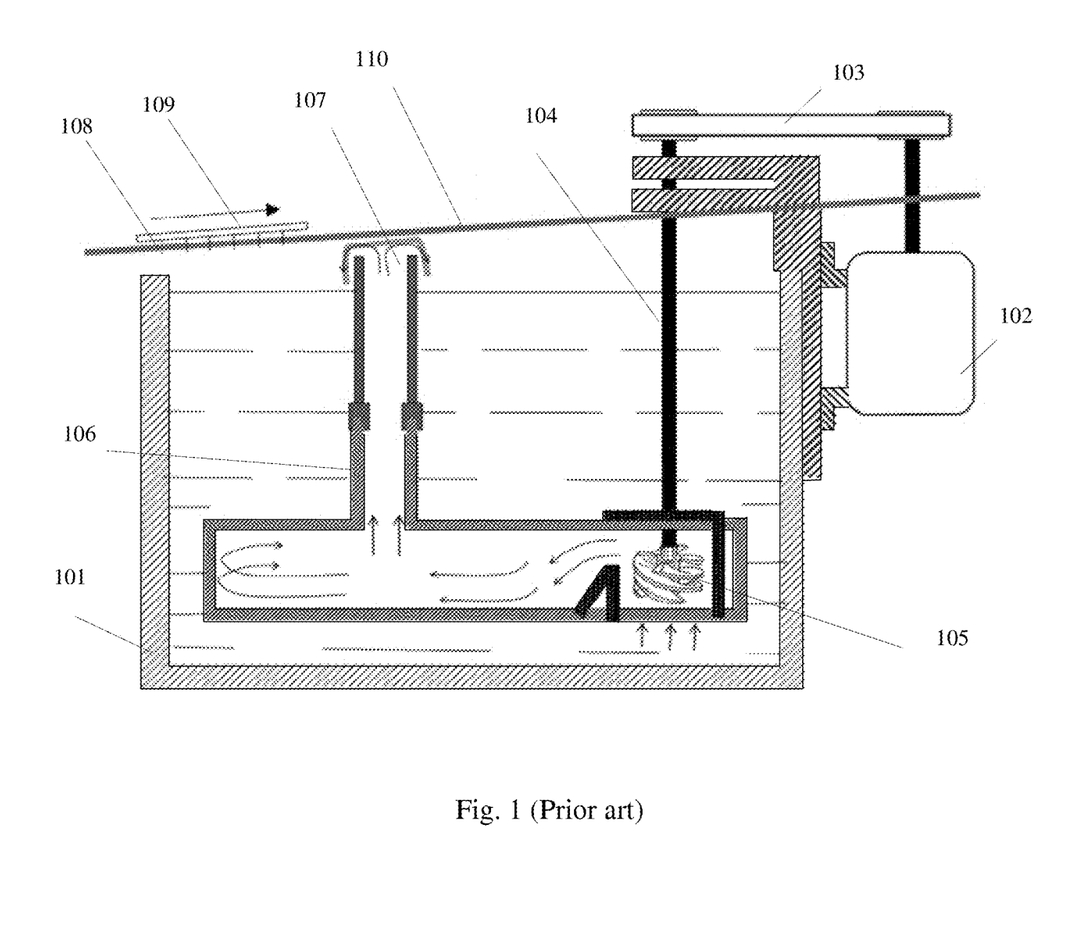
FIG. 1 is a schematic diagram of an existing typical wave soldering apparatus.

FIG. 1 is a schematic diagram of an existing typical wave soldering apparatus. As shown, in the solder tank 101 is stored molten solder (e.g., a solder such as a lead and tin alloy). A motor 102 of a pump device drives a rotation shaft 104 to rotate through a transmission belt 103; the rotation shaft 104 is inserted into the solder tank 101 from the top of the solder tank 101; at the end of the rotation shaft 104 are provided helical blades 105, which, when rotating, drive the molten solder through a conduit 106 to a nozzle 107 to be discharged, thus forming a solder wave. At the same time, a circuit board 109 with components 108 inserted is carried on a conveying belt 110 to pass by the nozzle 107, coming into contact with the solder wave discharged from the nozzle 107 thus to perform soldering.

Figure 2:
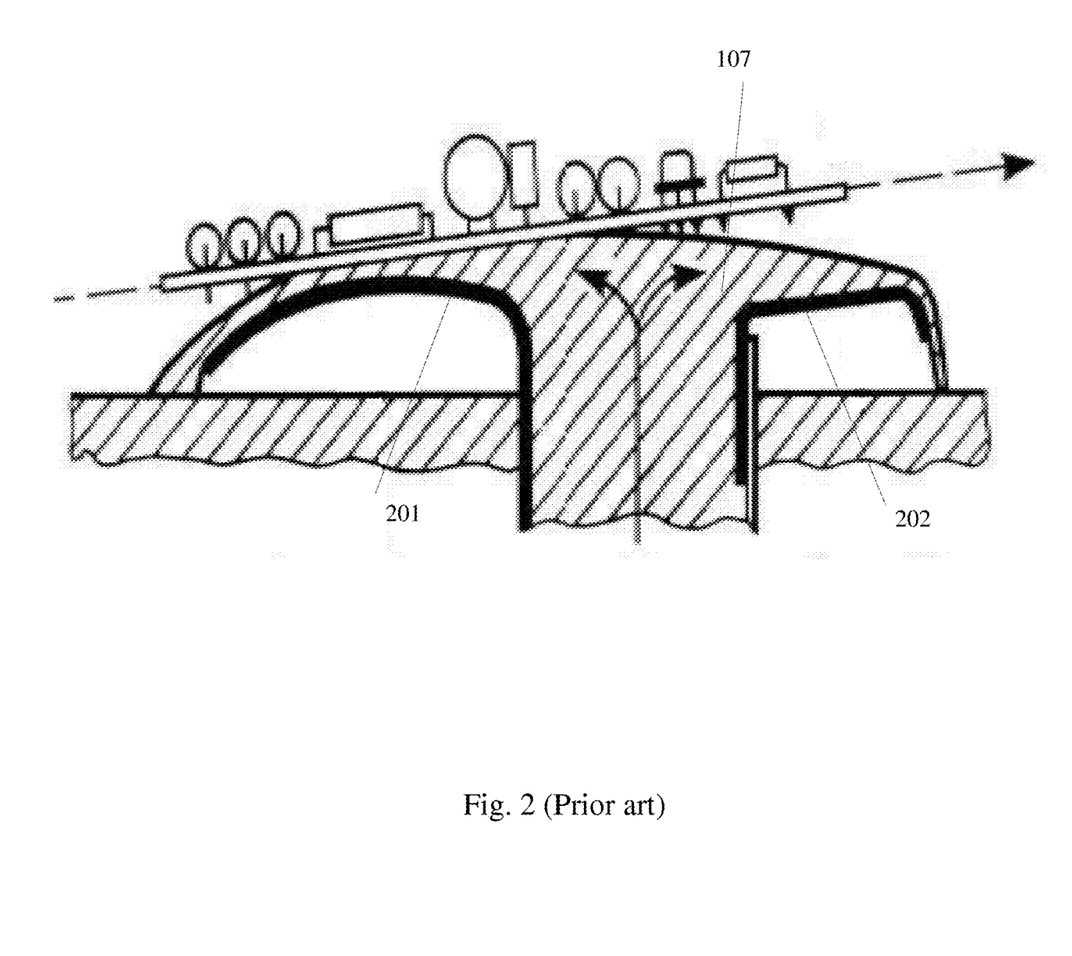
FIG. 2 illustrates an existing typical single wave nozzle structure.
Figure 3:
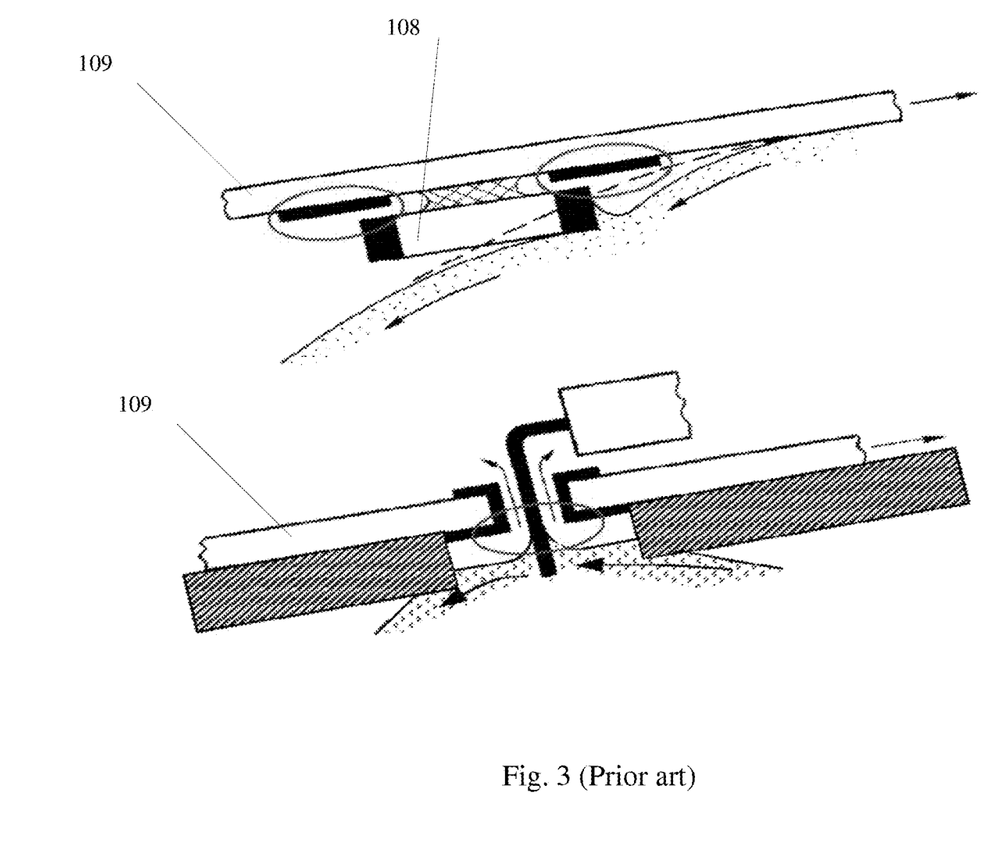
FIG. 3 is a schematic diagram illustrating the producing of the shadow effect.

Since wave soldering is performed through the circuit board coming into contact with the solder wave discharged form the nozzle, the design of the nozzle has much impact on the quality of soldering. FIG. 2 illustrates an existing typical single wave nozzle structure. As shown, the nozzle 107 consists of a front plate 201 and an adjustable rear plate 202; and solder will be discharged from between the two plates and move towards the two sides, forming a flat wave. Such a nozzle design has the defect of being prone to produce the shadow effect. FIG. 3 is a schematic diagram illustrating the production of the shadow effect. As shown in the upper part of FIG. 3, when the circuit board 109 moving in one direction comes into contact with the molten solder moving in the other direction, at the root of the component protruding on the circuit board 109 some air will be entrapped, thus forming bubbles, lowering the soldering quality. Additionally, as shown in the lower part of FIG. 3, the solder cannot fill sufficiently the insert hole on the circuit board 109, leaving some space, which also affects the soldering quality.

Figure 4:
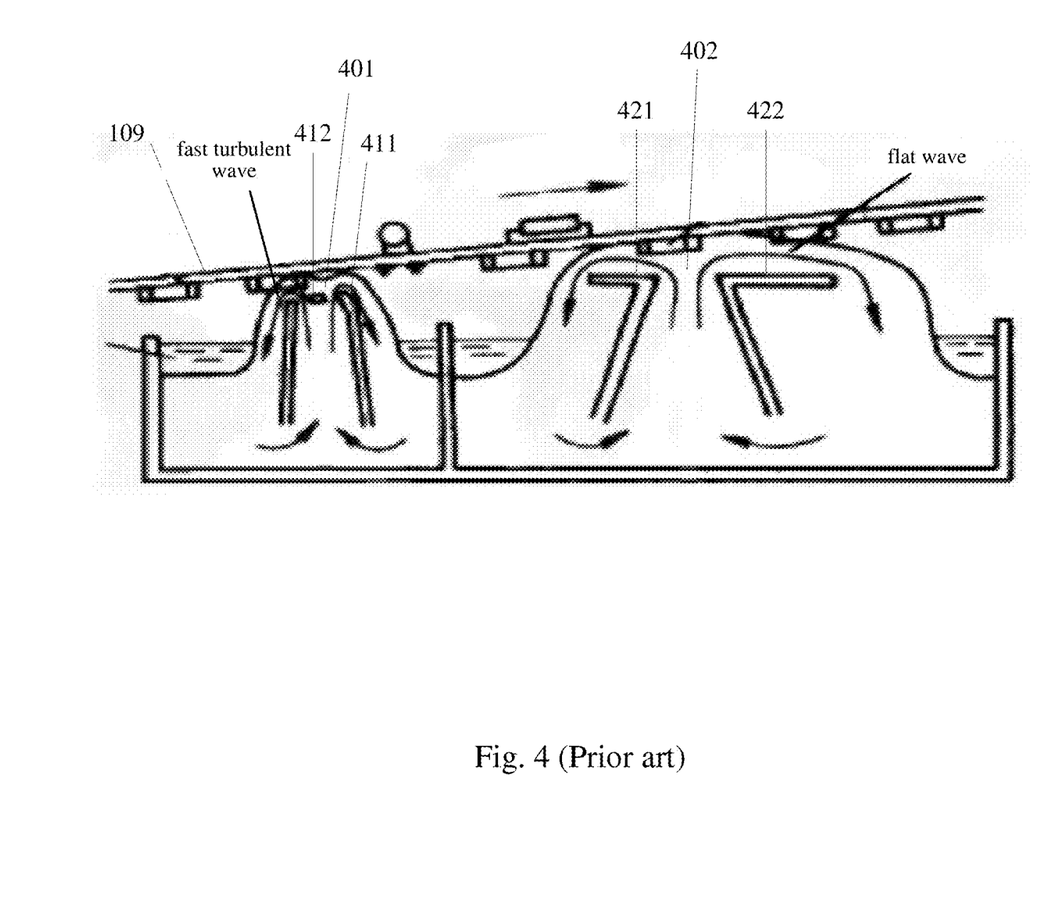
FIG. 4 illustrates an existing typical double wave nozzle structure.

FIG. 4 illustrates an existing typical double wave nozzle structure. As shown, the circuit board 109 will pass by two nozzles 401 and 402 when moving on the conveying belt. The first nozzle 401 comprises two side plates 411 and a block piece 412 between the side plates. The solder is discharged from the small gaps formed between the block piece 412 and side plates 411, forming a fast turbulent wave, which is conducive to eliminate the shadow effect and bubbles. The second nozzle 402 comprises a front plate 421 and rear plate 422 distanced farther apart, and the solder is discharged from between the front plate 421 and rear plate 422, forming a flat wave, which can reshaping the solder points. While such a double wave nozzle structure can eliminate the shadow effect, it needs two nozzles with different structures, which usually need to be driven by two pumps, resulting in a complex apparatus, high cost and high energy consumption. Additionally, such a double wave nozzle structure makes the contact area between the solder and the air larger, thus producing more dross. Further, using such a nozzle structure, the high temperature molten solder on the circuit board and components after the turbulent wave soldering will become solidified due to the lower temperature, thus preventing the high temperature molten solder to wick during the flat wave soldering, further degrading the soldering quality. Therefore, in the industry, usually only flat wave soldering is used to solder insert components.

Additionally, as known in the field, when the solder in the solder tank comes into contact with air, tin oxide (SnO and $SnO_2$) will be produced, thus forming dross. During the process of wave soldering, the top surface of the molten solder in the solder tank is exposed in the air, thus dross is formed easily. Especially around the rotation shaft 104, due to the fast air flow, a large amount of dross is formed more easily. The forming of dross causes a great waste of material, and also increases the cleaning cost.

Further, during the process of wave soldering, when the high temperature molten solder comes into contact with the circuit board, a large amount of high temperature waste gas will be produced, causing loss of energy.

It can be seen that there is a need for an improved wave soldering technique which can overcome one or more of the shortcomings of the existing wave soldering techniques in the field.

SUMMARY

In order to overcome at least one shortcomings of the existing wave soldering techniques, a solution of the present invention is provided.

According to an aspect of the present invention, there is provided an apparatus used for wave soldering, comprising: a nozzle device configured to discharge molten solder to a circuit board near a solder tank, wherein, the nozzle device comprises at least one pair of adjacent nozzle openings configured to discharge the molten solder towards the middle between the pair of nozzle openings.

In another aspect of the present invention, there is provided a pump device used for wave soldering, configured to deliver the molten solder in a solder tank through a conduit into a nozzle for soldering, wherein, the pump device is installed on a side of the solder tank for wave soldering.

In a further aspect of the present invention, there is provided an air isolating device used for wave soldering, configured to isolate the solder and air during wave soldering, comprising: a cover disposed on the solder tank, with an opening provided thereon only for exposing a nozzle device.

The nozzle device according to an embodiment of the present invention can eliminate the shadow effect produced by the existing single wave nozzle structure, making the insert holes on the circuit board to be filled sufficiently, thus enhancing the soldering quality. Additionally, compared with the existing double wave nozzle, the solidification of the solder between the two nozzles is eliminated, also enhancing the soldering quality. And moreover, a single pump device may be used to provide solder to the two nozzle openings, thus simplifying the apparatus structure, saving the apparatus cost and the energy.

The pump device according to an embodiment of the present invention enable the nozzle device to occupy the whole width of the top surface of the solder tank, thus larger circuit boards may be soldered, and a cover covering the top surface of the solder tank may be manufactured and installed more easily, thus reducing the solder dross produced by contact between the solder and air at the top surface of the solder tank, and substantially reducing the large amount of dross produced by the fast air flow around the rotation shaft.

The air isolating device according to an embodiment of the present invention can not only reduce the production of dross, but also fully utilize the heat of the waste gas produced during the soldering process, saving the energy.

DETAILED DESCRIPTION

Figure 5:
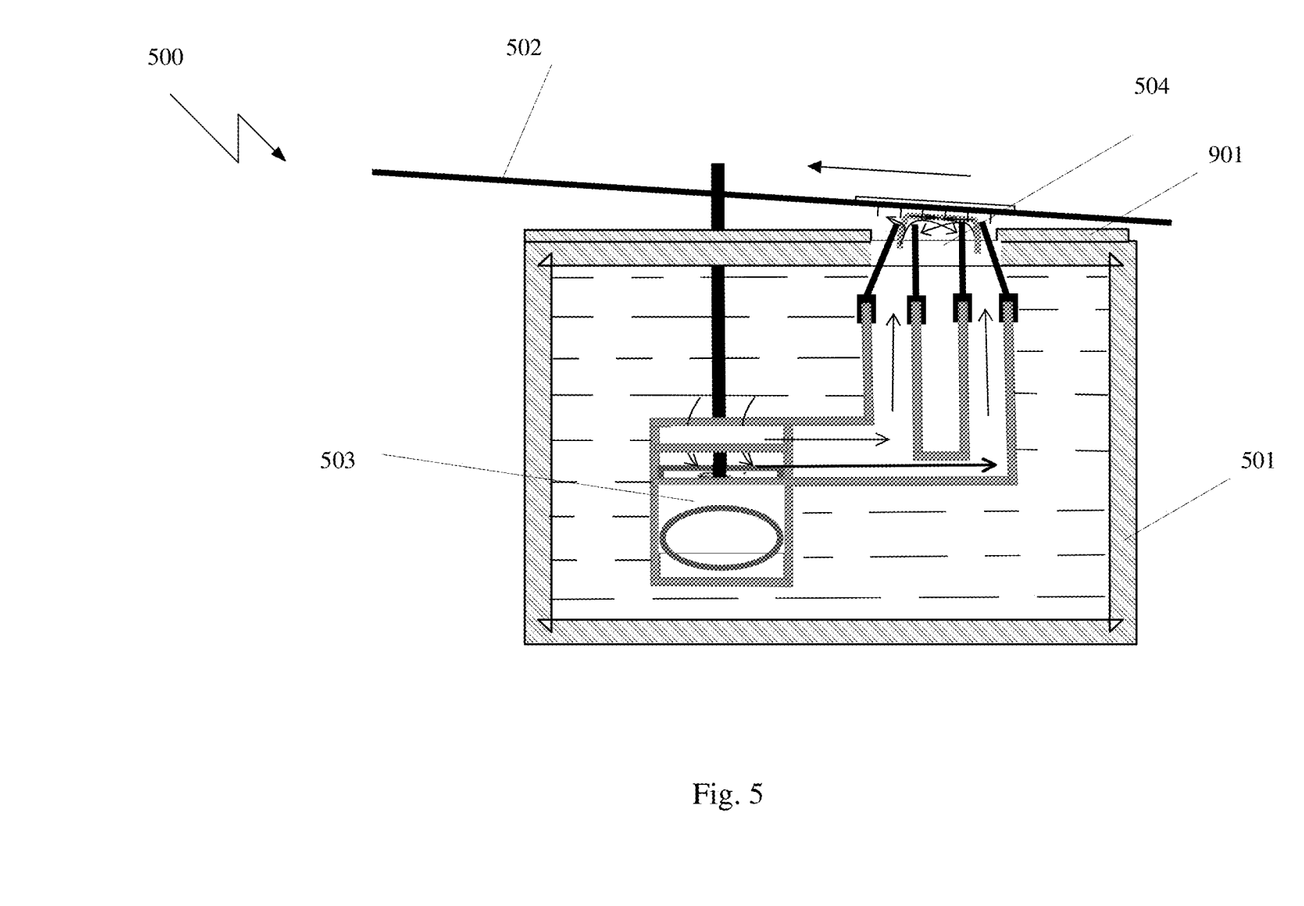
FIG. 5 illustrates a view of a wave soldering apparatus according to an embodiment of the present invention.

Referring now to FIG. 5, a view of a wave soldering apparatus 500 according to an embodiment of the present invention is illustrated. As shown, the wave soldering apparatus 500 comprises: a solder tank 501 configured to store molten solder; a conveying device 502 configured to convey a circuit board to be soldered to pass by the solder tank; a pump device 503 configured to transmit the molten solder in the solder tank through a conduit to a nozzle device; and the nozzle device 504 configured to discharge the molten solder to the circuit board near the solder tank, wherein the nozzle device 504 comprises at least one pair of adjacent nozzle openings, the pair of nozzle openings are configured to discharge the molten solder towards the middle between the pair of nozzle openings.

The solder tank 501 may be any existing or to-be-developed solder tank for wave soldering, such as, for example, a solder tank with a cover according to an embodiment of the present invention as described below. The conveying device 502 may be any existing or to-be-developed conveying device for wave soldering; the conveying device may comprises, for example, a conveying belt which may carry a circuit board to be soldered to pass by the solder tank. The pump device 503 may be any existing or to-be-developed pump device for wave soldering, such as, for example, a pump device installed on a side of the solder tank according to an embodiment of the present invention.

Figure 6:
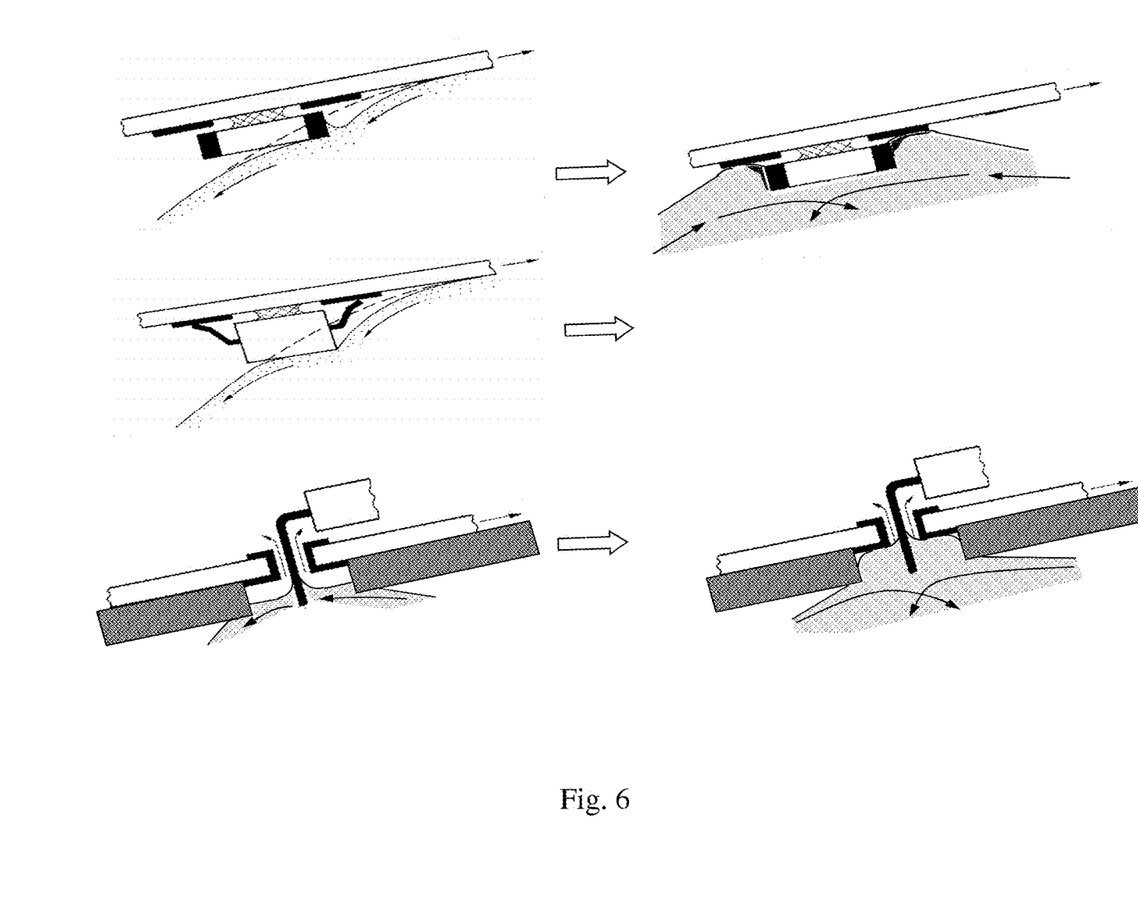
FIG. 6 is a schematic diagram illustrating that the solder wave produced by the nozzle device according to an embodiment of the present invention eliminates the shadow effect as compared with the solder wave produced by the conventional single wave nozzle device as shown in FIG. 2.

The nozzle device 504 makes the solder wave to be discharged from the nozzle openings at the two sides towards the middle therebetween, thus forming a flat and slow solder surface between the two nozzle openings. The nozzle device 504 actually combines the conventional turbulent wave and flat wave, with the flat wave at the outer side and the turbulent wave at the inner side, and the width of the wave surface not increasing as compared with the conventional flat wave. In this way, the soldering quality is enhanced, while the heat impact on the components or the circuit board is not increased; at the same time, the solder wave flows from the two sides towards the middle, plus the fluctuating disturbances inside the solder wave, which is conducive to the release of air near the solder root, thus greatly reducing the likelihood of entrap air inside the solder connections to form bubbles; and the solder wave flowing from the two sides towards the middle is conducive to the solder wave filling and wicking in the solder insert holes, and more easily covering the solder pads blocked by the component bodies or wave soldering devices, thus eliminating the shadow effect and enhancing the soldering quality. Referring to FIG. 6, a schematic diagram illustrating that the solder wave produced by the nozzle device according to an embodiment of the present invention eliminates the shadow effect as compared to the solder wave produced by the conventional single wave nozzle device as shown in FIG. 2. As shown, compared with the soldering by the conventional single wave nozzle device, the nozzle device 504 according to an embodiment of the present invention eliminates the bubbles formed at the root of the protruding component on the circuit board, thus enhancing the soldering quality; additionally, the solder fills sufficiently the insert hole in the circuit board, leaving no space, thus also enhancing the soldering quality.

Figure 7:
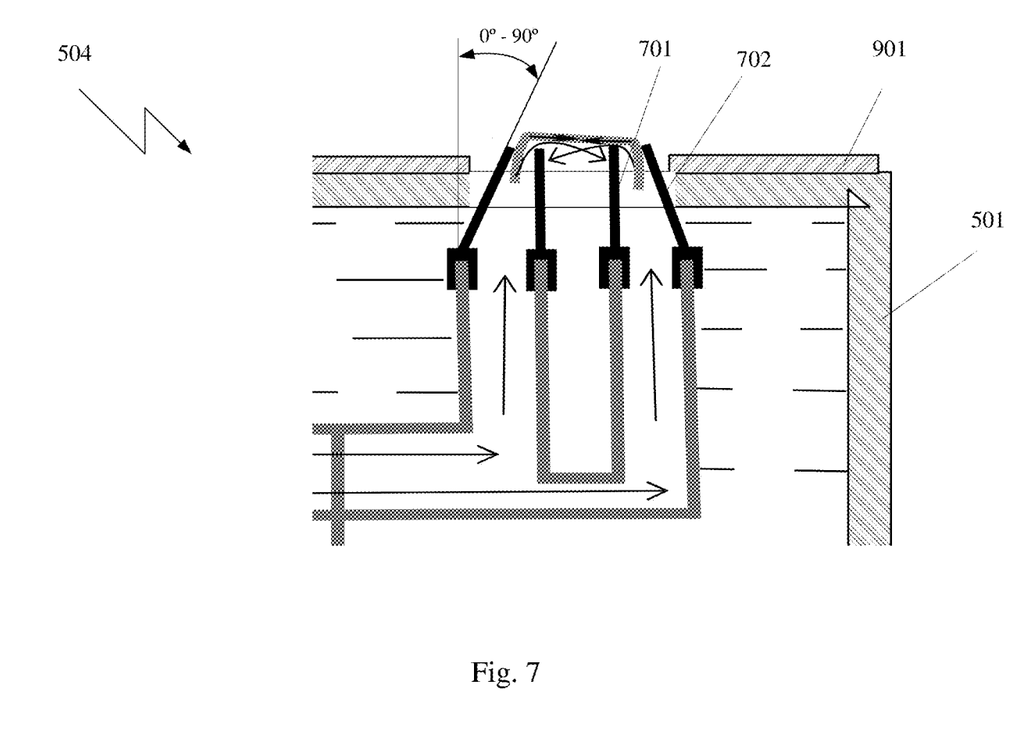
FIG. 7 is a more detailed diagram of a nozzle device according to an embodiment of the present invention.

FIG. 7 is a more detailed diagram of the nozzle device 504 according to an embodiment of the present invention. As shown, according to the embodiment of the present invention, each nozzle opening of the pair of nozzle openings of the nozzle device 504 is formed by a vertical plate 701 and an inclined plate 702, with the vertical plate of each nozzle opening at the inner side of the pair of nozzle openings and the inclined plate of each nozzle opening at the outer side of the pair of nozzle openings.

According to a further embodiment of the present invention, the inclination of the inclined plate 702 of each nozzle opening is adjustable between 0 and 90 degree. By adjusting the inclination of the inclined plate 702, the flow rate, flow quantity etc. of the solder wave discharged from the nozzle opening may be adjusted to suit different soldering requirements. For example, the bigger the inclination of the inclined plate 702 is adjusted to be, the smaller the gap of the nozzle opening becomes, thus the higher the flow rate and the smaller the flow quantity of the solder wave is discharged. The adjustment of the inclination of the inclined plate 702 may be performed either manually, or automatically, such as under the control of a computer. Of course, in other embodiments of the present invention, the nozzle openings may also have other structures formed by other components, and as long as the two nozzle openings discharge a solder wave towards the middle there between, any structure thereof is within the scope of the present invention. For example, each nozzle opening may also be formed by two inclined plates having different inclinations, with the inclination of the outer inclined plate being bigger than the inclination of the inner inclined plate.

According to an embodiment of the present invention, the distance between the pair of nozzle openings is configured such that the time period during which the component on the circuit board passes through the high temperature solder between the pair of nozzle openings conforms to the specification on the staying period of a component in high temperature solder. As known by those skilled in the art, since too long a staying period of a component in high temperature solder will cause damage thereto, relevant specifications in the field have specified the maximum staying period of a component in high temperature solder, for example, 5-7 seconds. The distance between the pair of nozzle openings according to an embodiment of the present invention is configured such that the time period during which the component on the circuit board moving with the conveying belt passes through the high temperature solder between the pair of nozzle openings is an appropriate time period which is less than this maximum staying period while at the same time ensuring the soldering quality.

Returning to FIG. 5, according to an embodiment of the present invention, the pump device 503 is a single pump device configured to drive the molten solder in the solder tank through a conduit to each nozzle opening of the pair of adjacent nozzle openings of the nozzle device 504. Compared the conventional double wave nozzle device using two pumps to provide solder to the two nozzles respectively, the nozzle device 504 according to an embodiment of the present invention uses a single pump device 503 to provide solder to the two nozzle openings, thus simplifying the apparatus structure, and saving the apparatus cost and energy.

Above is described a wave soldering apparatus 500 according to an embodiment of the present invention, mainly comprising an improved nozzle device. According to a further embodiment of the present invention, the wave soldering apparatus 500 further comprises a pump device 503.

Figure 8:
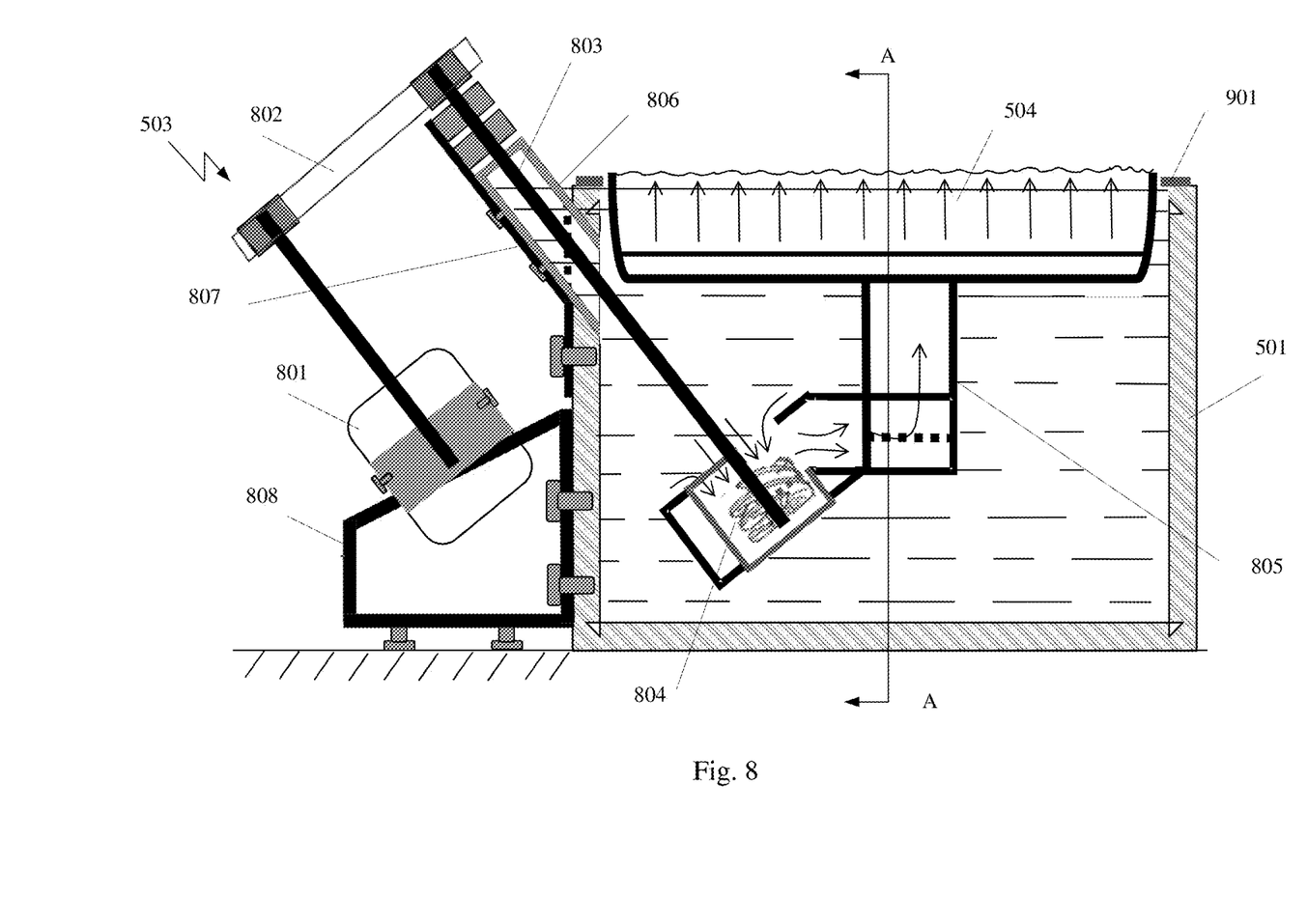
FIG. 8 illustrates another view of a wave soldering apparatus according to an embodiment of the present invention.

FIG. 8 illustrates another view of the wave soldering apparatus 500 according an embodiment of the present invention; the view shown in FIG. 5 is actually a sectional view along A-A in this view. FIG. 8 illustrates the position and structure of the pump device 503 more clearly. As shown in FIG. 8, the pump device 503 is installed on a side of the solder tank 501. Further, the pump device 503 is installed inclinedly on a side of the solder tank 501. In this way, the pump device 503 will not occupy the area of the top surface of the solder tank 501, so that the nozzle device 504 may occupy the whole width of the top surface shown in FIG. 8, so as to be able to solder larger circuit boards. Additionally, a cover 901 may be manufactured and installed more easily to cover the top surface of the solder tank 501, so as to expose only the nozzle device 504, reducing contact of the solder and the air, thus reducing the amount of dross produced. Moreover, compared with the rotation shaft of an existing pump device inserting vertically into the solder tank from the top surface of the solder tank, the rotation shaft of the pump device 503 according to the embodiment of the present invention is inserted into the solder tank 501 from the side, thus it is easier to realize the isolation of the air surrounding the rotation shaft with the solder, so that the large amount of dross produced due to the fast air flow around the rotation shaft is reduced substantially.

As shown in FIG. 8, according to an embodiment of the present invention, the pump device 503 comprises: a rotation shaft 803 inserted into the solder tank through an opening provided on a side of the solder tank; a motor driving the rotation shaft 803 to rotate thorough a transmission device 802; helical blades 804 at the end of the rotation shaft 803 and inserted into the molten solder, and when rotated with the rotation shaft 803, transmitting the molten solder through the conduit 805 to the nozzle device 504.

The motor 801 may be any appropriate motor known in the art or to be developed. The transmission device 802 may be any appropriate transmission device known in the art or to be developed, such as a transmission belt. The rotation shaft 803 may be any rotation shaft of an appropriate material and size known in the art or to be developed. The helical blades 804 may be any helical blades of an appropriate material, structure and size known in the art or to be developed. The conduit 805 may be any conduit of an appropriate material, construction and size known in the art or to be developed.

As shown in FIG. 8, according to a further embodiment of the present invention, the pump device 503 further comprises: a connecting pipe 806 disposed inclinedly on the opening in the side of the solder tank 501, with the rotation shaft 803 inserted into the connecting pipe (and further into the solder tank 501) through a hole in the end of the connecting pipe 806, and the connecting pipe being enclosed. In this way, the air cannot enter the solder tank 501 through the gap around the rotation shaft 803, thus greatly reducing the dross produced around the rotation shaft 803 during rotation of the shaft. As understandable to those skilled in the art, the enclosing of the connecting pipe 806 does not means the complete sealing of the connecting pipe, since there should be a hole for accommodating the rotation shaft 803 in the end of the connecting pipe 806, and there should be some clearance between the rotation shaft 803 and the hole for the rotation shaft to rotate freely. That is, the enclosing of the connecting pipe 806 means that apart from the hole in the end there is no other opening connecting with the outside air, and the clearance between the hole in the end and the rotation shaft 803 is small to just allow the rotation shaft to rotate freely therein. Of course, it may also be contemplated to provide a device such as a bearing between the hole in the end of the connecting pipe 806 and the rotation shaft, which can ensure both the free rotation of the rotation shaft 803 and a good sealing. The connecting pipe 806 may be any connecting pipe of an appropriate material, construction and size known in the art or to be developed. According to a further embodiment of the present invention, inert gas may be introduced into the connecting pipe 806, for example, through an inert gas inlet (not shown) provided in the side wall of the connecting pipe, to further isolate contact of the air with the solder in the solder tank 501 through the connecting pipe 806, thus further reducing the generation of dross around the rotation shaft 806.

As shown in FIG. 8, according to a further embodiment of the present invention, the pump device 503 further comprises: a first holding member 806 secured on the side wall of the solder tank 501 and configured to support the connecting pipe 806; a second holding member 806 secured on the side wall of the solder tank 501 and configured to support the motor 806. The first holding member 807 and the second holding member 808 may be any holding members of an appropriate material, construction and size known in the field or to be developed, and may be secured to the side wall of the solder tank 501 using any securing means (e.g., through a screw) known in the art or to be developed.

It is to be understood that although a specific exemplary structure of the pump device 503 according to a specific embodiment of the present invention is illustrated in FIG. 8 and described above, the specific exemplary structure is not a limitation to the present invention. In other embodiments of the present invention, the pump device 503 may have other structures.

Above is described an improved pump device 503 in a wave soldering apparatus 500 according to an embodiment of the present invention. According to a further embodiment of the present invention, the wave soldering apparatus 500 may further comprise an air isolating device.

Figure 9:
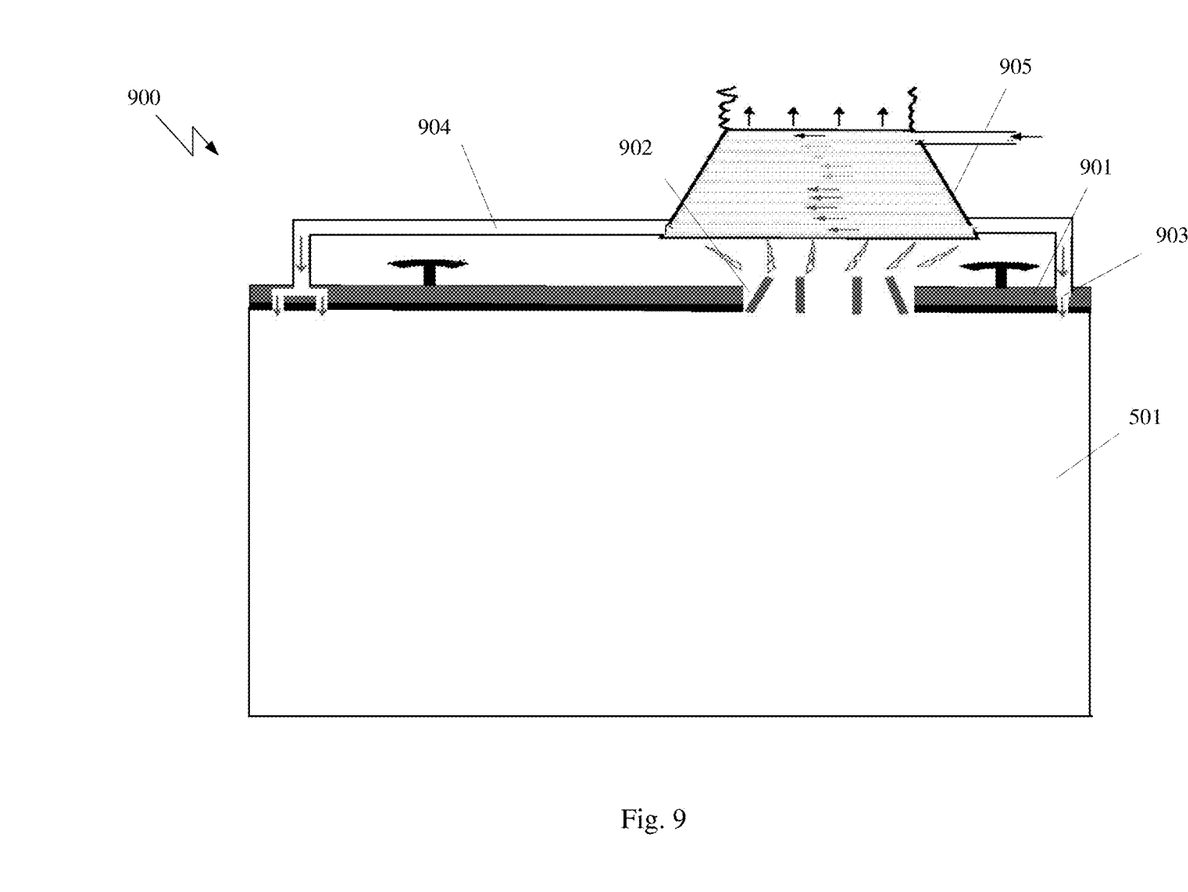
FIG. 9 illustrates an air isolating device included in a wave soldering apparatus according to an embodiment of the present invention.

Referring to FIG. 9, an air isolating device 900 included in a wave soldering apparatus 500 according to an embodiment of the present invention is illustrated. As shown, the air isolating device 900 comprises a cover 901 disposed on the solder tank 501, the cover being provided with an opening 902 for only exposing the nozzle device. In this way, contact between the solder in the solder tank 501 and the air can be reduced substantially, thus reducing the generation of dross. In an embodiment of the present invention, the pump device 503 (not shown in FIG. 9) is preferably provided on a side of the solder tank 501, which is more conducive to manufacturing and installing a cover which can effectively isolate the air.

According to an embodiment of the present invention, on the cover 901 or on the solder tank 501 is further provided an inert gas inlet 903 for injecting inert gas from an inert gas source (not shown) through an inert gas transmission duct 904 into the solder tank 501 to isolate the solder and the air, and the air isolating device further comprises: an exhausting device 905 disposed above the solder tank and configured to collect and discharge waste gas generated during the wave soldering process, wherein the inert gas transmission duct 904 passes through the exhausting device 905, thus when the inert gas passes through the part of the inert gas transmission duct 904 in the exhausting device 905, it is heated by the waste gas in the exhausting device 905. The inert gas may be any inert gas used for isolating the air and solder during wave soldering known in the art or to be developed, such as nitrogen, etc. In this way, not only the generation of dross may be reduced, but also the heat of the waste gas generated during the wave soldering is utilized substantially, thus saving the energy.

As described above, according to a further embodiment of the present invention, in the connecting pipe 806 of the pump device 503 is also provided an inert gas inlet (not shown), an inert gas transmission duct 904 connecting with this inert gas inlet to transmit the inert gas into the connecting pipe 806, thus further isolating the solder in the connecting pipe 806 with the air.

According to a further embodiment of the present invention, the exhausting device 905 is formed by an enclosing wall made of double layers of aluminum, with adhesives filled between the double layers of aluminum, and the part of the inert gas transmission duct 904 in the exhausting device 905 is disposed at least partially in the adhesives. Of course, this is only an exemplary structure of the exhausting device 905, and in other embodiments of the present invention, the exhausting device 905 may have other structures.

While a wave soldering apparatus 500 according to various embodiments of the present invention is described above, it is to be noted that the above description is only an example, rather than limitation to the present invention. In other embodiments of the present invention, the wave soldering device 500 may have more, less and different components and different structures. Additionally, as understandable to those skilled in the art, in the above description and drawings are actually disclosed a nozzle device used for wave soldering, a pump device used for wave soldering, and an air isolating device used for wave soldering according to embodiments of the present invention. A simple description of these devices will be presented below, while more detailed description of these devices may be found in the contents described above.

In another aspect of the present invention, there is provided a nozzle device configured to discharge molten solder to a circuit board near a solder tank, wherein the nozzle device comprises at least one pair of adjacent nozzle openings configured to discharge the molten solder towards the middle between the pair of nozzle openings.

According to an embodiment of the present invention, each nozzle opening of the pair of nozzle openings is formed by a vertical plate and an inclined plate, the vertical plate of each nozzle opening at the inner side of the pair of nozzle openings, and the inclined plate of each nozzle opening at the outer side of the pair of nozzle openings.

According to an embodiment of the present invention, the distance between the pair of nozzle openings is configured so that the time period during which the component on the circuit board passes through the high temperature solder between the pair of nozzle openings conforms to a specification on the staying period of a component in a high temperature solder.

According to an embodiment of the present invention, the inclination of the inclined plate of each nozzle opening is adjustable between 0 and 90 degree According to an embodiment of the present invention, the pair of adjacent nozzle openings receive the molten solder delivered through a conduit by the single pump device.

In a further aspect of the present invention, there is provided a pump device used for wave soldering, wherein the pump device is installed on a side of the solder tank for wave soldering.

According to an embodiment of the present invention, the pump device comprises: a rotation shaft inserted into the solder tank through an opening provided in the side of the solder tank; a motor driving the rotation shaft to rotate through a transmission device; helical blades at the end of the rotation shaft and inserted into the solder tank, and when rotating along with the rotation shaft, delivering the molten solder in the solder tank through the conduit into the nozzle device.

According to an embodiment of the present invention, the pump device further comprises: a connecting pipe disposed inclinedly on the opening in the side of the solder tank, the rotation shaft inserted into the connecting pipe through a hold in the end of the connecting pipe, and the connecting pipe being substantially enclosed.

According to an embodiment of the present invention, the pump device further comprises: a first holding member secured on the side wall of the solder tank and configured to support the connecting pipe; a second holding member secured on the side wall of the solder tank and configured to support the motor.

In a further aspect of the present invention, there is provided an air isolating device used for wave soldering, comprising: a cover disposed on the solder tank, with an opening provided thereon only for exposing a nozzle device.

According to an embodiment of the present invention, on the cover or on the solder tank is further provided an inert gas inlet for injecting inert gas from an inert gas source through an inert gas transmission duct into the solder tank, in order to isolate the solder and the air, and the air isolating device further comprises: an exhausting device disposed above the solder tank and configured to collect and discharge waste gas produced during wave soldering; wherein the inert gas transmission duct passes through the exhausting device, so that the inert gas, when passing through the part of the inert gas transmission duct in the exhausting device, is heated by the waste gas in the exhausting device.

According to an embodiment of the present invention, the exhausting device is formed by an enclosing wall of double layers of aluminum, between the double layers of aluminum is filled with adhesives, and the part of the inert gas transmission duct in the exhausting device is disposed in the adhesives.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus used for wave soldering, comprising:
a nozzle device configured to discharge molten solder to a circuit board near a solder tank, wherein the nozzle device comprises at least one pair of adjacent nozzle openings configured to discharge the molten solder towards the middle between the pair of nozzle openings, and
a pump device comprising a connecting pipe disposed inclinedly on an opening on a side of the solder tank, with a rotation shaft inserted into the connecting pipe through a hole in an end of the connecting pipe, the connecting pipe being enclosed,
wherein each nozzle opening of the pair of nozzle openings is formed by a vertical plate and an inclined plate, the vertical plate of each nozzle opening is at the inner side of the pair of nozzle openings, and the inclined plate of each nozzle opening is at the outer side of the pair of nozzle openings, and
wherein the inclination of the inclined plate of each nozzle opening is adjustable between 0 and 90 degrees.

2. The apparatus according to claim 1, wherein the distance between the pair of nozzle openings is configured so that the time period during which the component on the circuit board passes through the high temperature solder between the pair of nozzle openings conforms to a specification on the staying period of a component in a high temperature solder.

3. The apparatus according to claim 1, wherein the pump device is comprised of a single pump device configured to drive the molten solder in the solder tank through a conduit to each nozzle opening in the adjacent nozzle openings of the nozzle device.

4. The apparatus according to claim 3, wherein the pump device is installed on a side of the solder tank.

5. The apparatus according to claim 4, wherein the pump device comprises:
a rotation shaft inserted into the solder tank through an opening disposed on the side of the solder tank;
a motor configured to drive the rotation shaft to rotate through a transmission device;
helical blades at the end of the rotation shaft and configured to drive the molten solder through the conduit to the nozzle device when it rotates along with the rotation shaft.

6. An apparatus used for wave soldering, comprising:
a nozzle device configured to discharge molten solder to a circuit board near a solder tank,
wherein the nozzle device comprises at least one pair of adjacent nozzle openings configured to discharge the molten solder towards the middle between the pair of nozzle openings; and
a pump device being a single pump device and configured to drive the molten solder in the solder tank through a conduit to each nozzle opening in the adjacent nozzle openings of the nozzle device,
wherein the pump device is installed on a side of the solder tank, and
wherein the pump device comprises:
a rotation shaft inserted into the solder tank through an opening disposed on the side of the solder tank;
a motor configured to drive the rotation shaft to rotate through a transmission device; helical blades at the end of the rotation shaft and configured to drive the molten solder through the conduit to the nozzle device when it rotates along with the rotation shaft; and
a connecting pipe disposed inclinedly on the opening on the side of the solder tank, with the rotation shaft inserted into the connecting pipe through a hole in an end of the connecting pipe, and connecting pipe being enclosed.

7. The apparatus according to claim 6, wherein on the connecting pipe is provided an inert gas inlet for injecting inert gas into the connecting pipe.

8. The apparatus according to claim 6, wherein the pump device further comprises:
a first holding member secured on the side wall of the solder tank and configured to support the connecting pipe;
a second holding member secured on the side wall of the solder tank and configured to support the motor.

9. The apparatus according to claim 4, further comprises a cover disposed on the solder tank, with an opening provided thereon only for exposing the nozzle device.

10. The apparatus according to claim 9, wherein on the cover or on the solder tank is further provided an inert gas inlet for injecting the inert gas from an inert gas source through an inert gas transmission duct in order to isolate the solder and air, and the wave soldering apparatus further comprises:
an exhausting device disposed above the solder tank and configured to collect and discharge the waste gas produced during the wave soldering process;
wherein the inert gas transmission duct passes through the exhausting device, so that the inert gas, when passing through the part of the inert gas transmission duct in the exhausting device, is heated by the waste gas in the exhausting device.

11. An apparatus used for wave soldering, comprising:
a nozzle device configured to discharge molten solder to a circuit board near a solder tank,
wherein, the nozzle device comprises at least one pair of adjacent nozzle openings configured to discharge the molten solder towards the middle between the pair of nozzle openings; and
a pump device being a single pump device and configured to drive the molten solder in the solder tank through a conduit to each nozzle opening in the adjacent nozzle openings of the nozzle device,
wherein the pump device is installed on a side of the solder tank, further comprising a cover disposed on the solder tank, with an opening provided thereon only for exposing the nozzle device,
wherein on the cover or on the solder tank is further provided an inert gas inlet for injecting the inert gas from an inert gas source through an inert gas transmission duct in order to isolate the solder and air, and the wave soldering apparatus further comprises:
an exhausting device disposed above the solder tank and configured to collect and discharge the waste gas produced during the wave soldering process;
wherein the inert gas transmission duct passes through the exhausting device, so that the inert gas, when passing through the part of the inert gas transmission duct in the exhausting device, is heated by the waste gas in the exhausting device, and
wherein the exhausting device is formed by an enclosing wall of double layers of aluminum, between the double layers of aluminum is filled with adhesives, and the part of the inert gas transmission duct in the exhausting device is disposed in the adhesives.

12. The apparatus according to claim 1, wherein the rotation shaft is be driven by a driveshaft of a motor, wherein the driveshaft is connected to the rotation shaft by a transmission device.

13. The apparatus according to claim 12, wherein the transmission device comprises a transmission belt.

14. The apparatus according to claim 13, wherein the driveshaft is substantially parallel to the rotation shaft.

* * * * *